(12) United States Patent
Wang

(10) Patent No.: US 12,130,972 B2
(45) Date of Patent: Oct. 29, 2024

(54) TRACKING DEVICES FOR HANDHELD CONTROLLERS

(71) Applicant: Apple Inc., Cupertino, CA (US)

(72) Inventor: Paul X Wang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/352,650

(22) Filed: Jul. 14, 2023

(65) Prior Publication Data

US 2024/0094831 A1 Mar. 21, 2024

Related U.S. Application Data

(60) Provisional application No. 63/408,709, filed on Sep. 21, 2022.

(51) Int. Cl.
| | |
|---|---|
| *G06F 3/0354* | (2013.01) |
| *G06F 3/00* | (2006.01) |
| *G06F 3/01* | (2006.01) |
| *G06F 3/042* | (2006.01) |

(52) U.S. Cl.
CPC .......... *G06F 3/03542* (2013.01); *G06F 3/005* (2013.01); *G06F 3/016* (2013.01); *G06F 3/03545* (2013.01); *G06F 3/0425* (2013.01)

(58) Field of Classification Search
None
See application file for complete search history.

(56) References Cited

U.S. PATENT DOCUMENTS

| | | | |
|---|---|---|---|
| 7,927,216 B2 * | 4/2011 | Ikeda | A63F 13/235 463/37 |
| 8,568,233 B2 * | 10/2013 | Block | A63F 13/98 463/47 |
| 9,630,098 B2 | 4/2017 | Mikhailov et al. | |
| 10,146,335 B2 | 12/2018 | Balan et al. | |
| 10,147,243 B2 | 12/2018 | Yamamoto et al. | |
| 10,657,367 B2 | 5/2020 | Fei et al. | |
| 10,922,583 B2 | 2/2021 | Kaehler et al. | |
| 10,936,051 B2 | 3/2021 | Iyer et al. | |
| 10,990,186 B2 | 4/2021 | Wan et al. | |
| 11,112,932 B2 | 9/2021 | Powderly et al. | |
| 11,150,777 B2 | 10/2021 | Kaehler et al. | |
| 11,199,706 B2 | 12/2021 | Fortin-Deschênes et al. | |

(Continued)

*Primary Examiner* — Dorothy Harris
(74) *Attorney, Agent, or Firm* — Treyz Law Group, P.C.; Kendall P. Woodruff

(57) ABSTRACT

A system may include an electronic device such as a head-mounted device and a handheld input device for controlling the electronic device. A tracking device may be removably coupled to the handheld input device to increase the precision with which the head-mounted device tracks the handheld input device. The tracking device may have larger dimensions than the handheld input device and/or may have an expandable housing that expands and retracts. Visual markers on the tracking device may include infrared light-emitting diodes, geometric surface features, or other optical tracking features. The tracking device may serve as a secondary input device for the head-mounted device when the tracking device is decoupled from the input device. The tracking device may have a recess for receiving a shaft of the input device and may have magnets or other attachment structures for attaching the tracking device to the input device.

20 Claims, 10 Drawing Sheets

(56) References Cited

U.S. PATENT DOCUMENTS

| | | | |
|---|---|---|---|
| 11,460,698 B2 | 10/2022 | Bucknor et al. | |
| 2006/0066584 A1* | 3/2006 | Barkan | G06F 3/0428 345/173 |
| 2007/0265075 A1* | 11/2007 | Zalewski | A63F 13/24 463/36 |
| 2010/0238137 A1* | 9/2010 | Han | G06F 3/017 345/175 |
| 2012/0122576 A1* | 5/2012 | Mao | A63F 13/245 463/32 |
| 2014/0240102 A1* | 8/2014 | Kawash | G06F 3/017 340/12.5 |
| 2015/0212602 A1* | 7/2015 | Lor | G06F 3/048 345/175 |
| 2017/0357334 A1* | 12/2017 | Balan | G02B 27/0172 |
| 2019/0139393 A1* | 5/2019 | Kapron | G06F 3/016 |
| 2020/0384654 A1* | 12/2020 | Bae | B25J 13/088 |
| 2022/0147159 A1* | 5/2022 | Stancil | G06F 1/1656 |
| 2022/0413628 A1 | 12/2022 | Lohse et al. | |

\* cited by examiner

TRACKING DEVICES FOR HANDHELD CONTROLLERS

This application claims the benefit of provisional patent application No. 63/408,709, filed Sep. 21, 2022, which is hereby incorporated by reference herein in its entirety.

FIELD

This relates generally to computer systems and, more particularly, to input devices for computer systems.

BACKGROUND

Electronic devices such as computers can be controlled using computer mice and other input accessories. Some devices, such as tablet computers, have touch-sensitive displays. An input device such as a computer stylus may be used to interact with a touch-sensitive display. For example, a user of a stylus may draw on the display. In virtual reality systems, force-feedback gloves can be used to control virtual objects. Cellular telephones may have touch screen displays and vibrators that are used to create haptic feedback in response to touch input.

Devices such as these may not provide adequate location tracking, may not be convenient for a user, may be cumbersome or uncomfortable, or may provide inadequate feedback.

SUMMARY

A system may include an electronic device such as a head-mounted device and a handheld input device for controlling the electronic device. The head-mounted device or other device may have a display configured to display virtual content that is overlaid onto real-world content.

A tracking device may be removably coupled to the handheld input device to increase the precision with which the head-mounted device tracks the handheld input device. The tracking device may have larger dimensions than the handheld input device and/or may have an expandable housing that expands and retracts. Visual markers on the tracking device may include infrared light-emitting diodes, geometric surface features, or other optical tracking features. The tracking device may serve as a secondary input device for the head-mounted device when the tracking device is decoupled from the input device. The tracking device may have a recess for receiving a shaft of the input device and may have magnets or other attachment structures for attaching the tracking device to the input device.

DETAILED DESCRIPTION

Figure 1:
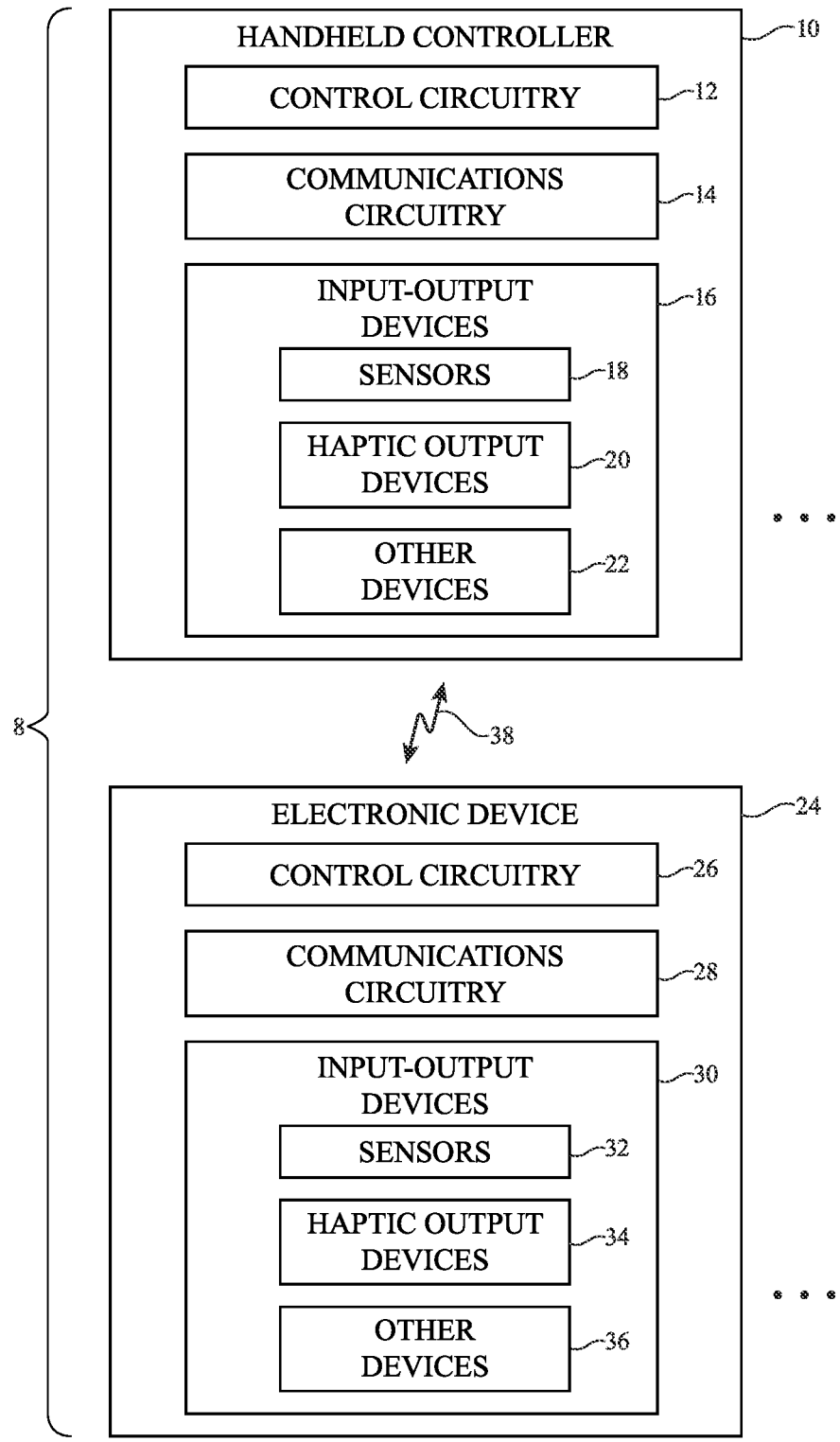
FIG. 1 is a schematic diagram of an illustrative system with one or more handheld controllers in accordance with an embodiment.

Electronic devices that are configured to be held in the hand of a user may be used to gather user input and to provide a user with output. For example, electronic devices that are configured to control one or more other electronic devices, which are sometimes referred to as controllers, handheld controllers, input devices, or handheld input devices, may be used to gather user input and to supply output. A handheld input device may, as an example, include an inertial measurement unit with an accelerometer for gathering information on input device motions such as swiping motions, waving motions, writing movements, drawing movements, shaking motions, rotations, etc., and may include wireless communications circuitry for communicating with external equipment such as a head-mounted device, may include tracking features such as active or passive visual markers that can be tracked with an optical sensor in an external electronic device, may include input devices such as touch sensors, force sensors, buttons, knobs, wheels, etc., and may include sensors for gathering information on the interactions between the handheld input device, the user's hands interacting with the input device, and the surrounding environment. The handheld input device may include a haptic output device to provide the user's hands with haptic output and may include other output components such as one or more speakers, visual indicators, etc.

One or more handheld input devices may gather user input from a user. The user may use the handheld input devices to control a virtual reality or mixed reality device (e.g., head-mounted equipment such as glasses, goggles, a helmet, or other device with a display). During operation, the handheld input device may gather user input such as information on interactions between the handheld input device(s) and the surrounding environment, interactions between a user's fingers or hands and the surrounding environment, and interactions associated with virtual content displayed for a user. The user input may be used in controlling visual output on a display (e.g., a head-mounted display, a computer display, etc.). Corresponding haptic output may be provided to the user's fingers using the handheld input device. Haptic output may be used, for example, to provide the fingers of a user with a desired sensation (e.g., texture, weight, torque, pushing, pulling, etc.) as the user interacts with real or virtual objects using the handheld input device. Haptic output can also be used to create detents, to provide localized or global haptic feedback in response to user input that is supplied to the handheld input device, and/or to provide other haptic effects.

Handheld input devices can be held in one or both of a user's hands. Users can use the handheld input devices to interact with any suitable electronic equipment. For example, a user may use one or more handheld input devices to interact with a virtual reality or mixed reality system (e.g., a head-mounted device with a display), to supply input to a desktop computer, tablet computer, cellular telephone, watch, ear buds, or other accessory, to control household items such as lighting, televisions, thermostats, appliances, etc., or to interact with other electronic equipment.

A tracking device may be removably attached to a handheld input device to enhance the precision with which an external electronic device tracks the location of the handheld input device. The tracking device may serve as a secondary input device, may have larger dimensions than the handheld input device, may have different tracking features than the handheld input device, and/or may have an expandable housing so that visual markers on the tracking device can be tracked with enhanced accuracy. If desired, the tracking device may include input-output devices to enhance the input-output capabilities of the handheld controller or other object. The tracking device may include input-output components, haptics, sensors, a battery, and/or other circuitry and may have a recess or other engagement structure configured to attach to the tip of a handheld controller. When the tracking device is coupled to the handheld controller, the tracking device and handheld controller may form a combined handheld input device (e.g., for a head-mounted device or other electronic device), with greater tracking precision and additional input-output capabilities provided by the tracking device. When the tracking device is removed from the handheld controller, the tracking device and handheld controller may be operated independently of one another and/or may be used as two separate handheld controllers for a head-mounted device or other device.

In some arrangements, the tracking device may attach to an item without electronics such as a cup or other handheld item. When the tracking device is placed on the item, the user can use the item as part of a virtual reality game or other virtual reality experience, and/or the user may use the item normally (e.g., by drinking from the cup and/or performing other tasks with the item), while the tracking device provides input-output capabilities by tracking the motion of the item, sensing information about the environment, providing haptic feedback, etc.

FIG. 1 is a schematic diagram of an illustrative system of the type that may include one or more handheld input devices such as one or more handheld controllers and one or more detachable tracking devices. As shown in FIG. 1, system 8 may include electronic device(s) such as handheld input device(s) 10 and other electronic device(s) 24. Each handheld input device 10 may be held in the hand of a user and/or may be attached to an item that is held in the hand of a user. For example, handheld input devices 10 may include one or more handheld controllers and one or more tracking devices (which may also be referred to as handheld input devices, handheld controllers, etc.). Additional electronic devices in system 8 such as devices 24 may include devices such as a laptop computer, a computer monitor containing an embedded computer, a tablet computer, a desktop computer (e.g., a display on a stand with an integrated computer processor and other computer circuitry), a cellular telephone, a media player, or other handheld or portable electronic device, a smaller device such as a wristwatch device, a pendant device, a headphone or earpiece device, a head-mounted device such as glasses, goggles, a helmet, or other equipment worn on a user's head, or other wearable or miniature device, a television, a computer display that does not contain an embedded computer, a gaming device, a remote control, a navigation device, an embedded system such as a system in which equipment is mounted in a kiosk, in an automobile, airplane, or other vehicle, a removable external case for electronic equipment, a strap, a wrist band or head band, a removable cover for a device, a case or bag that has straps or that has other structures to receive and carry electronic equipment and other items, a necklace or arm band, a wallet, sleeve, pocket, or other structure into which electronic equipment or other items may be inserted, part of a chair, sofa, or other seating (e.g., cushions or other seating structures), part of an item of clothing or other wearable item (e.g., a hat, belt, wrist band, headband, sock, glove, shirt, pants, etc.), or equipment that implements the functionality of two or more of these devices.

With one illustrative configuration, which may sometimes be described herein as an example, device 10 is a handheld input device having an elongated marker-shaped housing configured to be grasped within a user's fingers or a housing with other shapes configured to rest in a user's hand, and device(s) 24 is a head-mounted device, cellular telephone, tablet computer, laptop computer, wristwatch device, a device with a speaker, or other electronic device (e.g., a device with a display, audio components, and/or other output components). A handheld input device with a marker-shaped housing may have an elongated housing that spans across the width of a user's hand and that can be held like a pen, pencil, marker, wand, or tool. Devices 10 may also include one or more tracking devices that can be removably coupled to other input devices 10.

Devices 10 and 24 may include control circuitry 12 and 26. Control circuitry 12 and 26 may include storage and processing circuitry for supporting the operation of system 8. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 12 and 26 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

To support communications between devices 10 and 24 and/or to support communications between equipment in system 8 and external electronic equipment, control circuitry 12 may communicate using communications circuitry 14 and/or control circuitry 26 may communicate using communications circuitry 28. Circuitry 14 and/or 28 may include antennas, radio-frequency transceiver circuitry, and other wireless communications circuitry and/or wired communications circuitry. Circuitry 14 and/or 28, which may sometimes be referred to as control circuitry and/or control and communications circuitry, may, for example, support bidirectional wireless communications between devices 10 and 24 over wireless link 38 (e.g., a wireless local area network link, a near-field communications link, or other suitable wired or wireless communications link (e.g., a Bluetooth® link, a WiFi® link, a 60 GHz link, an ultra-wideband communications link, or other millimeter wave link, etc.). Devices 10 and 24 may also include power circuits for transmitting and/or receiving wired and/or wireless power and may include batteries. In configurations in which wireless power transfer is supported between devices 10 and 24, in-band wireless communications may be supported using inductive power transfer coils (as an example).

Devices 10 and 24 may include input-output devices such as devices 16 and 30. Input-output devices 16 and/or 30 may be used in gathering user input, in gathering information on the environment surrounding the user, and/or in providing a user with output. Devices 16 may include sensors 18 and devices 30 may include sensors 32. Sensors 18 and/or 32 may include force sensors (e.g., strain gauges, capacitive force sensors, resistive force sensors, etc.), audio sensors such as microphones, touch and/or proximity sensors such as capacitive sensors, optical sensors such as optical sensors that emit and detect light, ultrasonic sensors (e.g., ultrasonic sensors for tracking device orientation and location and/or for detecting user input such as finger input), and/or other touch sensors and/or proximity sensors, monochromatic and color ambient light sensors, image sensors, sensors for detecting position, orientation, and/or motion (e.g., accelerometers, magnetic sensors such as compass sensors, gyroscopes, and/or inertial measurement units that contain some or all of these sensors), muscle activity sensors (EMG) for detecting finger actions, radio-frequency sensors, depth sensors (e.g., structured light sensors and/or depth sensors based on stereo imaging devices), optical sensors such as self-mixing interferometric sensors and light detection and ranging (lidar) sensors that gather time-of-flight measurements, optical sensors such as visual odometry sensors that gather position and/or orientation information using images gathered with digital image sensors in cameras, gaze tracking sensors, visible light and/or infrared cameras having digital image sensors, humidity sensors, moisture sensors, and/or other sensors. In some arrangements, devices 10 and/or 24 may use sensors 18 and/or 32 and/or other input-output devices 16 and/or 30 to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.). If desired, device 10 and/or device 24 may include rotating buttons (e.g., a crown mechanism on a watch or other suitable rotary button that rotates and that optionally can be depressed to select items of interest). Alphanumeric keys and/or other buttons may be included in devices 16 and/or 30. In some configurations, sensors 18 may include joysticks, roller balls, optical sensors (e.g., lasers that emit light and image sensors that track motion by monitoring and analyzing changings in the speckle patterns and other information associated with surfaces illuminated with the emitted light as device 10 is moved relative to those surfaces), fingerprint sensors, and/or other sensing circuitry. Radio-frequency tracking devices may be included in sensors 18 to detect location, orientation, and/or range. Beacons (e.g., radio-frequency beacons) may be used to emit radio-frequency signals at different locations in a user's environment (e.g., at one or more registered locations in a user's home or office). Radio-frequency beacon signals can be analyzed by devices 10 and/or 24 to help determine the location and position of devices 10 and/or 24 relative to the beacons. If desired, devices 10 and/or 24 may include beacons. Frequency strength (received signal strength information), beacon orientation, time-of-flight information, and/or other radio-frequency information may be used in determining orientation and position information. At some frequencies (e.g., lower frequencies such as frequencies below 10 GHz), signal strength information may be used, whereas at other frequencies (e.g., higher frequencies such as frequencies above 10 GHz), indoor radar schemes may be used). If desired, light-based beacons, ultrasonic beacons, and/or other beacon devices may be used in system 8 in addition to or instead of using radio-frequency beacons and/or radio-frequency radar technology.

Devices 16 and/or 30 may include haptic output devices 20 and/or 34. Haptic output devices 20 and/or 34 can produce motion that is sensed by the user (e.g., through the user's fingertips). Haptic output devices 20 and/or 34 may include actuators such as electromagnetic actuators, motors, piezoelectric actuators, electroactive polymer actuators, vibrators, linear actuators (e.g., linear resonant actuators), rotational actuators, actuators that bend bendable members, actuator devices that create and/or control repulsive and/or attractive forces between devices 10 and/or 24 (e.g., components for creating electrostatic repulsion and/or attraction such as electrodes, components for producing ultrasonic output such as ultrasonic transducers, components for producing magnetic interactions such as electromagnets for producing direct-current and/or alternating-current magnetic fields, permanent magnets, magnetic materials such as iron or ferrite, and/or other circuitry for producing repulsive and/or attractive forces between devices 10 and/or 24). In some situations, actuators for creating forces in device 10 may be used in applying a sensation on a user's fingers (e.g., a sensation of weight, texture, pulling, pushing, torque, etc.) and/or otherwise directly interacting with a user's fingers. In other situations, these components may be used to interact with each other (e.g., by creating a dynamically adjustable electromagnetic repulsion and/or attraction force between a pair of devices 10 and/or between device(s) 10 and device(s) 24 using electromagnets).

If desired, input-output devices 16 and/or 30 may include other devices 22 and/or 36 such as displays (e.g., in device 24 to display images for a user), status indicator lights (e.g., a light-emitting diode in device 10 and/or 24 that serves as a power indicator, and other light-based output devices), speakers and other audio output devices, electromagnets, permanent magnets, structures formed from magnetic material (e.g., iron bars or other ferromagnetic members that are attracted to magnets such as electromagnets and/or permanent magnets), batteries, etc. Devices 10 and/or 24 may also include power transmitting and/or receiving circuits configured to transmit and/or receive wired and/or wireless power signals.

Figure 2:
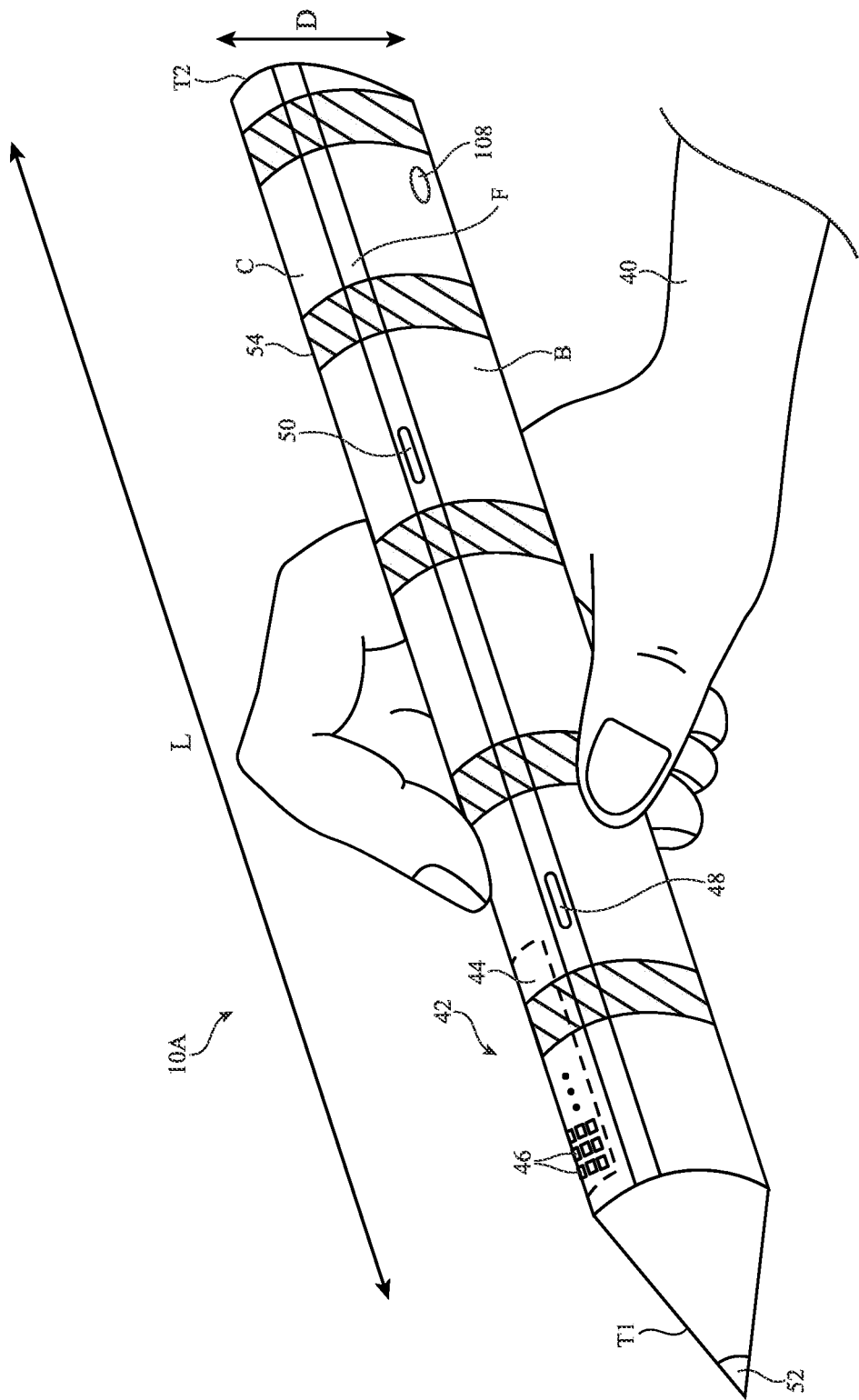
FIG. 2 is a perspective view of an illustrative handheld controller in accordance with an embodiment.

FIG. 2 is a perspective view of a user's hands (hands 40) and an illustrative handheld input device 10A (sometimes referred to as a handheld controller). As shown in FIG. 2, input device 10A may be an elongated marker-shaped electronic device that fits within the user's hand 40. The elongated shape of input device 10A allows hand 40 to hold input device 10A as if it were a pen, pencil, marker, or other writing implement. In other configurations, input device 10A may be held in hand 40 as a wand or baton would be held. In general, input device 10A may be held in hand 40 in any suitable manner (e.g., at the end, in the middle, between two, three, four, or all five fingers, with both hands, etc.).

A user may hold one or more of devices 10A simultaneously. For example, a user may hold a single one of devices 10A in the user's left or right hand. As another example, a user may hold a first device 10A in the user's left hand and a second device 10A in the user's right hand. Arrangements in which multiple devices 10A are held in one hand may also be used. Configurations in which devices 10A have bodies that are held within a user's hands are sometimes described herein as an example.

Control circuitry 12 (and, if desired, communications circuitry 14 and/or input-output devices 16) may be contained entirely within device 10A (e.g., in housing 54) and/or may include circuitry that is located in an external structure (e.g., in an external electronic device such as device 24, a console, a storage case, etc.).

In general, electrical components such as control circuitry 12, communications circuitry 14, and/or input-output devices 16 (e.g., sensors 18, haptic output devices 20, and/or other devices 22) may be mounted within and/or on the surface(s) of input device housing 54 in any suitable locations.

As shown in FIG. 2, housing 54 may have an elongated marker shape, elongated tube shape, elongated cylindrical shape, and/or any other elongated shape. Housing 54 which may sometimes be referred to as an enclosure, body, or case, may be formed of plastic, glass, ceramics, fiber composites, metal (e.g., stainless steel, aluminum, etc.), fabric, other suitable materials, or a combination of any two or more of these materials. Housing 54 may be formed using a unibody configuration in which some or all of housing 54 is machined or molded as a single structure or may be formed using multiple structures (e.g., an internal frame structure, one or more structures that form exterior housing surfaces, etc.). Housing 54 may form outer housing walls, tip portions, and/or internal support structures for device 10A. Housing 54 may have a length L between 140 mm and 150 mm, between 130 mm and 160 mm, between 100 mm and 200 mm, between 120 mm and 160 mm, greater than 180 mm, less than 180 mm, or any other suitable length. The diameter D of housing 54 may be between 12 mm and 14 mm, between 10 mm and 15 mm, between 11 mm and 16 mm, between 15 mm and 20 mm, between 18 mm and 25 mm, greater than 25 mm, less than 25 mm, or any other suitable diameter.

Housing 54 may have one or more curved surfaces and one or more planar surfaces. In the illustrative example of FIG. 2, device 10A has a curved surface C that wraps around a first portion of device 10A and a flat surface F that extends along a second portion of device 10A. If desired, flat surface F may be located on a first side of device 10A and curved surface C may be located on a second opposing side of device 10A. Curved surface C and flat surface F wrap around device 10A to form an elongated tube shape that surrounds an elongated interior space for housing internal components such as control circuitry 12, communications circuitry 14, and input-output devices 16. Housing 54 may have an elongated shaft portion such as shaft B extending between first and second tip portions such as tip portion T1 at a first end of device 10A and tip portion T2 at a second opposing end of device 10A. One or both of housing tip portions T1 and T2 may be removable from the main elongated shaft B between tip portions T1 and T2.

Ultrasonic sensors, optical sensors, inertial measurement units, touch sensors such as capacitive touch sensor electrodes, strain gauges and other force sensors, radio-frequency sensors, and/or other sensors may be used in gathering sensor measurements indicative of the activities of device 10A and/or hand 40 holding device 10A.

In some configurations, input device position, movement, and orientation may be monitored using sensors that are mounted in external electronic equipment (e.g., in a computer or other desktop device, in a head-mounted device or other wearable device, and/or in other electronic device 24 that is separate from device 10A). For example, optical sensors such as images sensors that are separate from device 10A may be used in monitoring device 10A to determine their position, movement, and/or orientation. If desired, devices 10A may include passive and/or active optical registration features to assist an image sensor in device 24 in tracking the position, orientation, and/or motion of device 10A. For example, devices 10A may include light-emitting devices. The light-emitting devices may include light-emitting diodes, lasers (e.g., laser diodes, vertical cavity surface-emitting lasers, etc.), or other light sources and may operate at visible wavelengths, ultraviolet wavelengths, and/or infrared wavelengths. The light-emitting devices may be arranged in an asymmetric pattern on housing 54 and may emit light that is detected by an image sensor, depth sensor, and/or other light-based tracking sensor circuitry in device 24 (e.g., a head-mounted device, desktop computer, stand-alone camera-based monitoring systems, and/or other electrical equipment with an image sensor or other tracking sensor circuitry). By processing the received patterned of emitted light, device 24 can determine the position, orientation, and/or motion of device 10A. If desired, the light-emitting devices can be removable and/or customizable (e.g., a user can customize the location and type of light-emitting devices).

Tracking can also be performed that involves extrapolating from a known body part orientation (e.g., a finger orientation) to produce orientation information on other body parts (e.g., wrist and/or arm orientation estimated using inverse kinematics). Visual odometry sensors may, if desired, be included in devices 10A. These sensors may include image sensors that gather frames of image data of the surroundings of devices 10A and may be used in measuring position, orientation, and/or motion from the frame of image data. Lidar, ultrasonic sensors oriented in multiple directions, radio-frequency tracking sensors, and/or other input device tracking arrangements may be used, if desired. In some arrangements, user input for controlling system 8 can include both user input to input device 10A and other user input (e.g., user eye gaze input, user voice input, etc.). For example, gaze tracking information such as a user's point-of-gaze measured with a gaze tracker can be fused with input to input device 10A when controlling device 10A and/or devices 24 in system 8. A user may, for example, gaze at an object of interest while device 10A uses one or more of sensors 18 (e.g., an accelerometer, force sensor, touch sensor, etc.) to gather information such as tap input (tap input in which a user taps on device 10A with one or more fingers, tap input in which device 10A taps a table top or other external surface or object, and/or any other tap input resulting in measurable forces and/or accelerometer output from device 10A), double-tap input, force input, input device gestures (tapping, swiping, twirling, shaking, writing, drawing, painting, sculpting, gaming, and/or other gestures with device 10A, gestures on external surfaces with device 10A, gestures on external objects with device 10A, gestures interacting with virtual objects, gestures with input device 10A in the air, etc.), drag and drop operations associated with objects selected using a lingering gaze or other point-of-gaze input, etc. The input from input device 10A to system 8 may include information on finger orientation, position, and/or motion relative to input device 10A, may include information on how forcefully a finger is pressing against surfaces of input device 10A (e.g., force information), may include information on how forcefully input device 10A is pressed against an object or external surface (e.g., how forcefully a tip portion such as tip portion T1 presses against an external surface), may include pointing input (e.g., the direction in which input device 10A is pointing), which may be gathered using radio-frequency sensors among sensors 18 and/or other sensors in device(s) 10A, and/or may include other input.

By correlating user input from a first of devices 10A with user input from a second of devices 10A and/or by otherwise analyzing sensor input, multi-device input may be detected and used in manipulating virtual objects or taking other actions in system 8. Consider, as an example, the use of a tap gesture with device 10A to select a virtual object associated with a user's current point-of-gaze. Once the virtual object has been selected based on the direction of the user's point-of-gaze (or pointing direction input) and based on the tap gesture input or other user input, further user input gathered with one or more devices 10A may be used to rotate and/or otherwise manipulate the virtual object. For example, information on input device movement (e.g., rotational movement) may be gathered using an internal measurement unit or other sensor 18 in device(s) 10A and this rotational input may be used to rotate the selected object. In some scenarios, an object may be selected based on point-of-gaze (e.g., when a user's point-of-gaze is detected as being directed toward the object) and, following selection, object attributes (e.g., virtual object attributes such as virtual object appearance and/or real-world object attributes such as the operating settings of a real-world device) can be adjusted using strain gauge input, touch sensor input, input device orientation input (e.g., to rotate a virtual object, etc.).

If desired, gestures such as air gestures (three-dimensional gestures) with device 10A may involve additional input. For example, a user may control system 8 using hybrid gestures that involve movement of device(s) 10A through the air (e.g., an air gesture component) and that also involve contact between device 10A and one or more fingers of hand 40. As an example, an inertial measurement unit in device 10A and/or a camera in device 24 may detect user movement of device 10A through the air (e.g., to trace out a path) while a sensor 18 in device 10A such as a two-dimensional touch sensor, a force sensor, or other sensor 18 detects force input, touch input, or other input associated with contact to device 10A.

The sensors in device 10A may, for example, measure how forcefully a user is moving device 10A against a surface (e.g., in a direction perpendicular to the surface) and/or how forcefully a user is moving device 10A along a surface (e.g., shear force in a direction parallel to the surface). The direction of movement of device 10A can also be measured by the force sensors and/or other sensors 18 in device 10A.

Information gathered using sensors 18 such as force sensor input gathered with a force sensor, motion data gathered with a motion sensor (e.g., pointing input, rotations, etc.), location information indicating the location of input device 10A, touch input gathered with a touch sensor, and other user input may be used to control external equipment such as device 24. For example, control circuitry 12 may send control signals to device 24 that include instructions to select a user interface element, instructions to scroll display content, instructions to select a different input function for input device 10A (e.g., to switch from using input device 10A as a drawing or writing implement to using input device 10A as a pointing device or game piece), instructions to draw a line or type a word on a display in device 24, instructions to adjust operational settings of device 24, instructions to manipulate display content on device 24, and/or instructions to take any other suitable action with device 24. These control signals may be sent in addition to or instead of providing feedback to sensor input from device 10A (e.g., haptic output, audio output, adjusting operational settings of device 10A, etc.).

In the illustrative configuration of FIG. 2, device 10A includes touch sensor 42. Touch sensor 42 may be formed from an array of capacitive touch sensor electrodes such as electrodes 46 overlapping one or more surfaces of housing 54 such as curved surface C, flat surface F, and/or surfaces on tip portions T1 and T2. Touch sensor 42 may be configured to detect swipes, taps, multitouch input, squeeze input, and/or other touch input. In some arrangements, touch sensor 42 is formed from a one-dimensional or two dimensional array of capacitive electrodes 46. In some arrangements, touch sensor 42 may be a strain gauge that detects squeeze input to housing 54 (e.g., when a user squeezes or pinches device 10A between the user's fingers). Touch sensor 42 may be used to gather touch input such as input from direct contact and/or close proximity with a different finger of the user or other external object. In the example of FIG. 2, touch sensor 42 overlaps touch input area 44 on curved surface C of device 10A. If desired, additional touch input may be gathered in adjacent areas such as flat surface F of housing 54. If desired, touch sensor 42 may include other types of touch sensing technologies such as optical touch sensors, acoustic-based touch sensors, etc. Touch sensor 42 may span the length L of device 10A, may span only partially along length L of device 10A, may cover some or all of curved surface C, may cover some or all of flat surface F, and/or may cover some or all of tip portions T1 and T2. If desired, touch sensor 42 may be illuminated, may overlap a display (e.g., to form a touch-sensitive display region on device 10A), may overlap an indicator or textured surface, and/or may otherwise be visually or tangibly distinct from the surrounding non-touch-sensitive portions of housing 54 (if desired).

In addition to or instead of touch sensor 42, device 10A may include one or more other user input devices such as user input device 48. User input device 48 may be a mechanical input device such as a pressable button, a rotating knob, a rotating wheel, a rocker switch, a slider, or other mechanical input device, a force sensor such as a strain gauge or other force sensor, an optical sensor such as a proximity sensor, a touch sensor such as a capacitive, acoustic, or optical touch sensor, and/or any other suitable input device for receiving input from a user's hand 40. If desired, one of haptic output devices 20 such as an actuator may be used to provide haptic feedback in response to user input to device 48. For example, input device 48 may be a touch-sensitive button that does not physically move relative to housing 54, but the user may feel a localized button click sensation from haptic output that is provided from an actuator 20 overlapping device 48.

In addition to or instead of touch sensor 42 and input device 48, device 10A may include one or more sensors at tip portions T1 and T2. For example, tip portion T1 and/or tip portion T2 may be force-sensitive. As shown in FIG. 2, device 10A may include sensor 52. Sensor 52 may be located at one or both of tip portions T1 and T2 and/or may be located elsewhere in device 10A such as at a location along shaft B of device 10A. Shaft B, which may sometimes be referred to as a cylindrical housing, may form an elongated main body portion of housing 54 of device 10A that extends between tip T1 and tip T2. One or more of tip portions T1 and T2 may be removable and may sometimes be referred to as a cap, a writing tip, etc. Sensors at tip portions T1 and T2 such as sensor 52 may include a device position sensor (e.g., an optical flow sensor having a light source that illuminates a portion of a surface that is contacted by device 10A and having an image sensor configured to determine a location of device 10A on the surface and/or to measure movement of the electronic device relative to the surface based on captured images of the illuminated portion, a mechanical position sensor such as an encoded wheel that tracks movements of device 10A on the surface, or other device position sensor), a force sensor (e.g., one or more strain gauges, piezoelectric force sensors, capacitive force sensors, and/or any other suitable force sensor), an optical proximity sensor such a light-emitting diode and light detector, a camera (e.g., a one-pixel camera or an in image sensor with a two-dimensional array of pixels), and/or other sensor.

Device 10A may include circuitry for receiving wired and/or wireless power. For example, wired power may be conveyed to device 10A through a charging port such as charging port 108, and wireless power may be conveyed to device 10A through capacitively coupled contacts and/or an inductive charging coil such as coil 50. If desired, device 10A may only receive wired power and coil 50 may be omitted. In other arrangements, device 10A may only receive wireless power and charging port 108 may be omitted (or port 108 may serve as a data port, audio port, or other suitable port). In arrangements where device 10A includes circuitry for receiving wireless power, power can be conveyed wirelessly between device 10A and an external electronic device such as device 24 (e.g., a head-mounted device, a wireless charging mat, a storage case, a battery case, a wireless charging puck, or other electronic device). As an example, contacts (e.g., metal pads) may be capacitively coupled (without forming ohmic contact) to allow power to be transferred and/or power can be conveyed using a wireless power transmitter with a coil in device 24 to transmit wireless power signals to a wireless power receiver with a coil in device 10A. Inductive power transfer techniques may be used (e.g., wireless power can be transmitted using one or more wireless power transmitting coils in device 24 and transmitted wireless power signals can be received in a power receiving circuit in device 10A using a power receiving coil such as coil 50). Received alternating-current wireless power signals from device 24 can be converted to direct-current power using a rectifier in device 10A for charging a battery in device 10A and/or for powering circuitry in device 10A. In configurations in which the power receiving circuit of device 10A receives power via a wired connection (e.g., using terminals), the power receiving circuit in device 10A may provide the received power to a battery and/or other circuitry in device 10A.

To help align wireless charging coil 50 in device 10A with a wireless charging coil in device 24 and/or to otherwise hold device 10A to a power source or other device (e.g., device 24 of FIG. 1), device 10A and device 24 may be provided with mating alignment features (e.g., mating protrusions and recesses and/or other interlocking alignment structures (e.g., key and keyhole structures that allow device 10A and/or device 24 to interlock when engaged by twisting or other locking motions), magnets (or ferromagnetic elements such as iron bars), and/or other alignment structures.

In configurations in which device 10A includes magnetic attachment structures (e.g., magnets, magnetic material that is attracted to magnets, or other magnetic attachment structures), device 10A may be held against the interior and/or exterior of device 24 using the magnetic attachment structures. For example, device 24 may be a battery case with a groove or other recess that receives device 10A. Magnetic attachment structures in device 24 (e.g., near the groove) and in device 10A may cooperate (magnetically attach) to help secure device 10A within the interior of the case (e.g., without allowing device 10A to rattle excessively inside the case). As another example, device 24 may be a head-mounted device (e.g., goggles and/or glasses) or a strap or other wearable device. In this type of arrangement, magnetic attachment structures may hold device 10A against an exterior surface of device 24 (e.g., against a portion of the housing of a pair of goggles or glasses such as along the frame of a pair of glasses, to the front, top, or side surface of a pair of goggles, etc.) or within a recess in the housing of device 24. Magnets and other alignment features may be located near coil 50 or may be located in other portions of housing 54.

Figure 3:
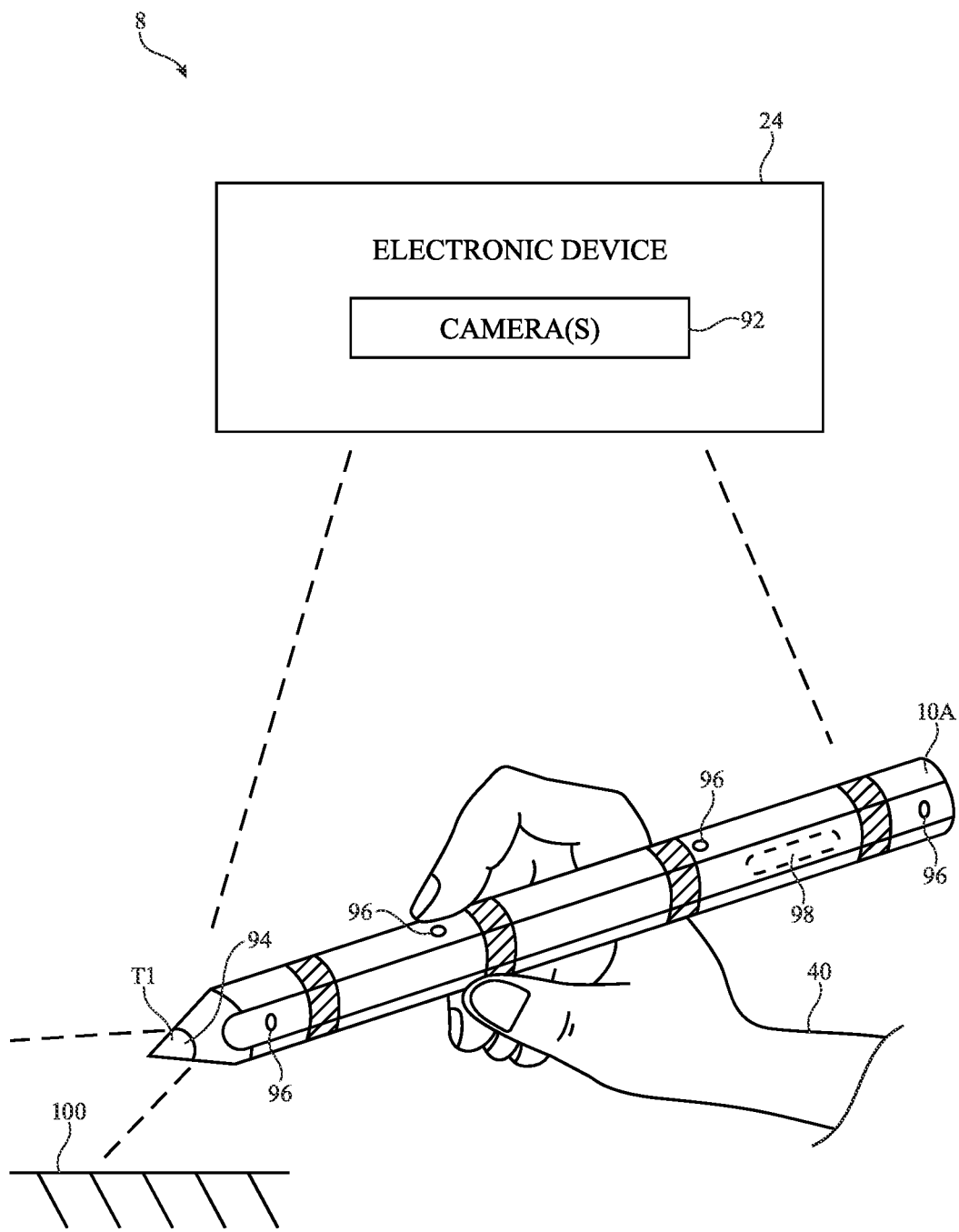
FIG. 3 is a diagram of an illustrative system including a handheld controller and an electronic device such as a head-mounted device in accordance with an embodiment.

As shown in FIG. 3, external equipment such as electronic device 24 in system 8 may contain sensors such as one or more cameras 92 (e.g., visual light cameras, infrared cameras, etc.). Electronic device 24 may, as an example, be a head-mounted device such as augmented reality (mixed reality) or virtual reality goggles (or glasses, a helmet, or other head-mountable support structures). Visual markers such as markers 96 may be placed on device 10A. Markers 96 may be, for example, passive visual markers such as bar codes, cross symbols, reflectors, or other visually identifiable patterns and may be applied to any suitable location of device 10A. Markers 96 may, if desired, include active visual markers formed from light-emitting components (e.g., visual light-emitting diodes and/or infrared light-emitting diodes modulated using identifiable modulation codes) that are detected using cameras such as camera 92. Markers 96 may help inform system 8 of the location of controller 10A as a user is interacting with a computer or other equipment in system 8. If desired, device 10A may include an optical sensor such as sensor 94 in tip portion T1. Optical sensor 94 may be a one-pixel camera or a two-dimensional array of pixels that forms an image sensor. Sensor 94 may be configured to capture images of the environment, which can be used by control circuitry 12 in device 10A and/or control circuitry 26 in device 24 to help track the location of device 10A. This may be useful in scenarios where hand 40 is blocking visual markers 96 on device 10A, for example.

Visual markers 96 on device 10A and/or inertial measurement units such as inertial measurement unit 98 (e.g., accelerometers, compasses, and/or gyroscopes) may be used in tracking the location of device 10A relative to device 24 and/or relative to an external object such as surface 100. At the same time, system 8 may display associated visual content for the user (e.g., using a display on device 24). The user may interact with the displayed visual content by supplying force input (e.g., to force sensor 52 in force-sensitive tip portion T1 of FIG. 2), motion input (e.g., air gestures, pointing gestures, rotations, etc.) detected by motion sensor 98, taps, shear force input, touch input (e.g., to touch sensor 42 of FIG. 2) and other input to device 10A.

For example, information on the location of device 10A relative to device 24 and/or surface 100 may be gathered by control circuitry 12 in device 10A or by control circuitry 26 of device 24 (e.g., head-mounted device, a computer, cellular telephone, or other electronic device) during operation of system 8 while monitoring device 10A for force input, gesture input (e.g., taps, three-dimensional air gestures, pointing input, writing or drawing input, etc.), touch input, and/or any other user input indicating that a user has selected (e.g., highlighted), moved, or otherwise manipulated a displayed visual element and/or provided commands to system 8. As an example, a user may make an air gesture with device 10A such as waving device 10A to the left to move visual content to the left. System 8 may use an inertial measurement unit in device 10A to detect the left hand wave gesture and can move visual elements being presented to the user with a display in device 24 in response to the left hand wave gesture. As another example, a user may select a visual element in the user's field of view by tapping on that element with device 10A and/or pointing towards the element with device 10A. A user may draw, paint, or otherwise move device 10A along surface 100 to form a corresponding drawing, painting, or other visual output on a display of device 24.

In this way, control circuitry 12 in device 10A and/or control circuitry 26 in device 24 may allow a user to manipulate visual elements being viewed by the user (e.g., virtual reality content or other visual content being presented with a head-mounted device such as augmented reality goggles or other device 24 with a display). If desired, a camera such as camera 92 may face the eyes of a user (e.g., camera 92 or other visual tracking equipment may form part of a gaze tracking system). The camera and/or other circuitry of the gaze tracking system may monitor the direction in which a user is viewing real-world objects and visual content. As an example, a camera may be used to monitor the point of gaze (direction of gaze) of a user's eyes as the user is interacting with virtual content presented by device 24 and as the user is holding controller 10A in hand 40. Control circuitry 12 in device 10A and/or control circuitry 26 in device 24 may measure the amount of time that a user's gaze dwells in particular locations and can use this point-of-gaze information in determining when to select virtual objects. Virtual objects can also be selected when it is determined that a user is viewing a particular object (e.g., by analyzing point-of-gaze information) and when it is determined that a user has made a voice command, finger input, button press input, or other user input to select the particular object that is being viewed. Point-of-gaze information can also be used during drag and drop operations (e.g., to move virtual objects in accordance with movement of the point-of-gaze from one location in a scene to another).

Figure 4:
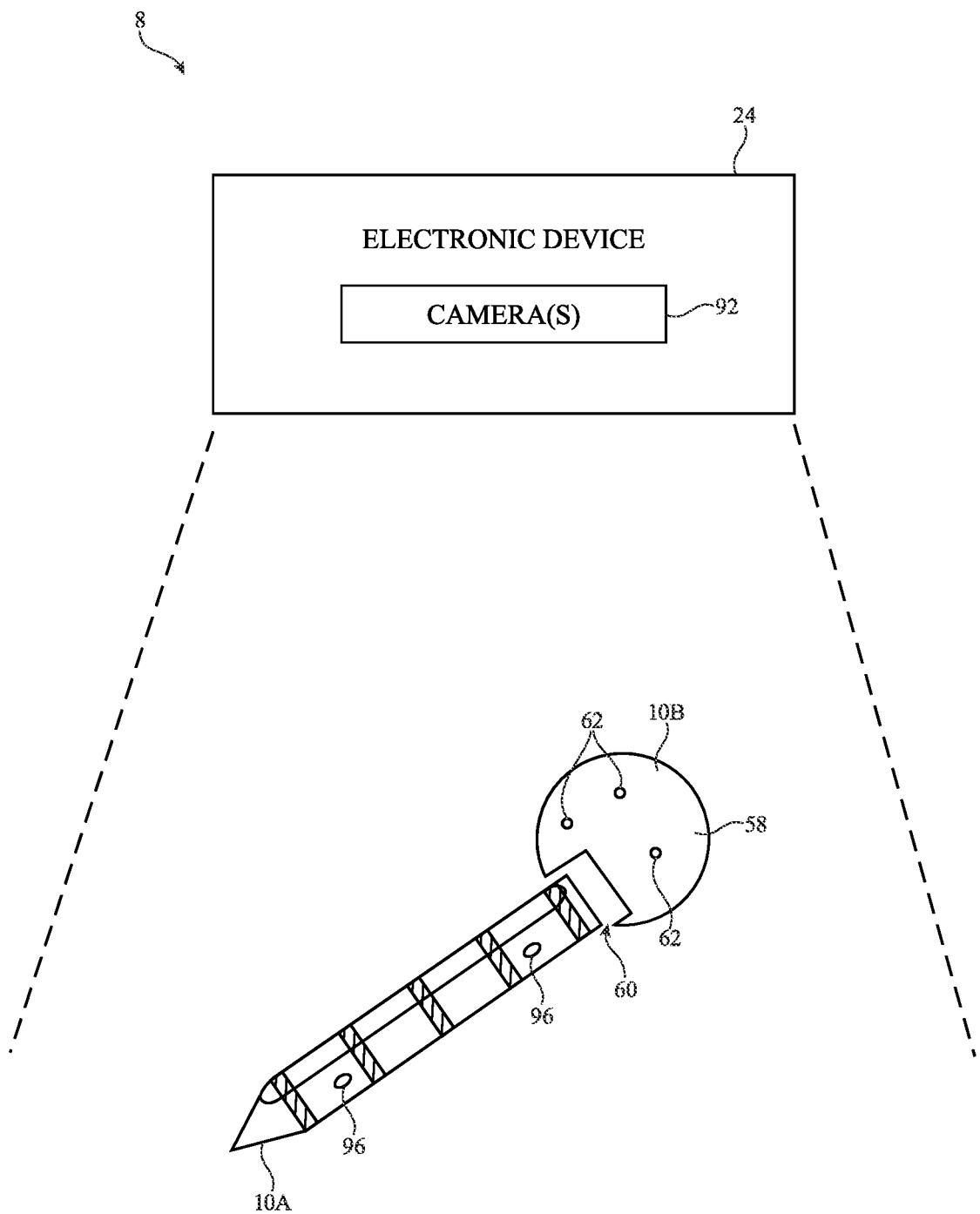
FIG. 4 is a diagram of an illustrative system including an electronic device such as a head-mounted device and a handheld controller coupled to a tracking device and in accordance with an embodiment.

In some arrangements, handheld input device 10A may be used as a stand-alone input device, with external device 24 using tracking features on device 10A to track the location of device 10A. In other arrangements, handheld input device 10A may be used with a secondary input device 10 such as tracking device 10B of FIG. 4. As shown in FIG. 4, tracking device 10B may be removably attached to input device 10A. When tracking device 10B is attached to input device 10A, tracking device 10B may be used to enhance the accuracy with which electronic device 24 tracks the position of input device 10A. For example, tracking device 10B may have larger dimensions than input device 10A (making tracking device 10B easier to track using camera 92 of device 24), may have an expandable housing that increases the size of tracking device 10B relative to input device 10A, may have additional and/or different visual markers from device 10A such as visual markers 62 to supplement visual markers 96 on input device 10A, and/or may have other circuitry such as input-output devices, sensors, haptics, a battery, etc.

In some arrangements, tracking device 10B may be attached to input device 10A so that device 24 can track the location of input device 10A with greater resolution and precision. In some arrangements, tracking device 10B may be removed from input device 10A and the two devices may be used as separate input devices for device 24 (e.g., with device 10A serving as a first handheld controller for providing first input to device 24 and device 10B serving as a second handheld controller for providing second input to device 24). In some arrangements, tracking device 10B may be attached to an item other than device 10A, such as an item with minimal or no electronics (e.g., a cup, pencil, pen, paint brush, water bottle, etc.), so that the item can be tracked using device 24 (e.g., so that the item can be used as an asset, player, tool, or other object in a virtual reality experience).

As shown in FIG. 4, tracking device 10B may include a housing such as housing 58. Housing 58 may have a spherical shape, a semi-spherical shape, a hoop or loop shape, a pyramidal shape, a disk shape, a cylindrical shape, a box shape, an umbrella shape, a cone shape, a shape with auxetic geometry, and/or any other suitable shape. Housing 58, which may sometimes be referred to as an enclosure or case, may be formed of plastic, glass, ceramics, fiber composites, metal (e.g., stainless steel, aluminum, etc.), fabric, other suitable materials, or a combination of any two or more of these materials. Housing 58 may have an opening such as recess 60 (e.g., a hole, cavity, groove, etc.). Recess 60 may be configured to receive input device 10A. Recess 60 may receive a tip of device 10A (e.g., one or both of tips T1 and T2 of FIG. 2). If desired, recess 60 may be a through-hole that extends from one side of housing 58 to an opposing side of housing 58 so that the shaft of input device 10A can be inserted entirely through tracking device 10B. Input device 10A and tracking device 10B may be coupled together using interlocking engagement features, screws, press fit connections, clasps, snaps, clips, magnets, magnetic material that is attracted to magnets, other magnetic attachment structures, and/or other attachment structures.

Tracking device 10B may be used to provide additional tracking capabilities to input device 10A and/or may provide other input-output capabilities to input device 10A. For example, visual markers 96 on input device 10A may provide sufficient tracking resolution for some applications, but input device 10A may not have sufficient size to be tracked with the desired level of precision for other applications (e.g., creative applications, writing applications, fine selection applications, etc.). Tracking device 10B may be larger than input device 10A and/or may include different tracking features so that external devices such as head-mounted device 24 can track the location of device 10A with improved tracking accuracy.

Tracking device 10B may have some or all of the circuitry described in connection with device 10 of FIG. 1 (e.g., control circuitry 12, communications circuitry 14, input-output devices 16 such as sensors 18, haptic output devices 20, other devices 22, and/or other circuitry). If desired, tracking device 10B may include a visual indicator or a display for providing visual output to a user holding device 10A or device 10B and/or for providing visual output to other people in the user's environment. For example, a visual indicator or display on tracking device 10B may indicate status information about a user wearing a head-mounted device such as device 24 while holding devices 10A and 10B. The status information may indicate whether the user is busy, available, immersed in a virtual reality experience, etc.

In some arrangements, the electrical components that are included in tracking device 10B may enhance the input-output capabilities of input device 10A to form a combined handheld input device 10 with more capabilities than input device 10A and tracking device 10B alone. For example, tracking device 10B may include additional battery to help charge circuitry within input device 10A or tracking device 10B, a haptic output device such as an electromagnetic actuator to provide haptic output (e.g., haptic output in associated with display content being displayed by a head-mounted display that is controlled by device 10A and/or device 10B, haptic output in response to user input to device 10A and/or device 10B, etc.), a visual indicator to provide visual output, tracking features such as motion sensor circuitry, a camera, and/or visual markers (e.g., infrared light-emitting diodes) so that device 10A and/or device 10B can be tracked by camera 92 in head-mounted device 24, and/or other circuitry.

Tracking device 10B may include visual markers such as markers 62 for providing tracking capabilities to tracking device 10B. Visual markers such as markers 62 may be placed on housing 58. Markers 62 may be, for example, passive visual markers such as bar codes, cross symbols, reflectors, geometric surface features, or other visually identifiable patterns and may be applied to any suitable location on housing 58 of device 10B. Markers 62 may, if desired, include active visual markers formed from light-emitting components (e.g., visual light-emitting diodes and/or infrared light-emitting diodes modulated using identifiable modulation codes) that are detected using cameras such as camera 92 of head-mounted device 24. Markers 62 may help inform system 8 of the location of input device 10A and input device 10B as a user is interacting with a computer or other equipment in system 8.

Visual markers 62 on tracking device 10B and/or inertial measurement units such as an inertial measurement unit in tracking device 10B and/or input device 10A may be used in tracking the location of input device 10A relative to device 24 and/or relative to an external object such as surface 100 (FIG. 3). At the same time, system 8 may display associated visual content for the user (e.g., using a display on device 24). The user may interact with the displayed visual content by supplying force input (e.g., to force sensitive tip 52 of input device 10A), motion input (e.g., air gestures, pointing gestures, rotations, etc.) detected by motion sensors in tracking device 10B and/or input device 10A, taps, shear force input, touch input, and other input to tracking device 10B and/or input device 10A.

For example, information on the location of input device 10A and/or tracking device 10B relative to device 24 and/or surface 100 may be gathered by control circuitry 12 in input device 10A and/or tracking device 10B or by control circuitry 26 of device 24 (e.g., head-mounted device, a computer, cellular telephone, or other electronic device) during operation of system 8 while monitoring devices 10A and/or 10B for force input, gesture input (e.g., taps, three-dimensional air gestures, pointing input, writing or drawing input, etc.), touch input, and/or any other user input indicating that a user has selected (e.g., highlighted), moved, or otherwise manipulated a displayed visual element and/or provided commands to system 8. As an example, a user may make an air gesture with input device 10A while tracking device 10B is attached to input device 10A (e.g., by waving device 10A to the left to move visual content to the left). System 8 may use an inertial measurement unit in device 10A, visual markers 96 on device 10A, an inertial measurement unit in tracking device 10B, and/or visual markers 62 on tracking device 10B to detect the left hand wave gesture and can move visual elements being presented to the user with a display in device 24 in response to the left hand wave gesture. In this way, control circuitry 12 in input device 10A and/or tracking device 10B and/or control circuitry 26 in device 24 may allow a user to manipulate visual elements being viewed by the user (e.g., virtual reality content or other visual content being presented with a head-mounted device such as augmented reality goggles or other device 24 with a display).

Figure 5:
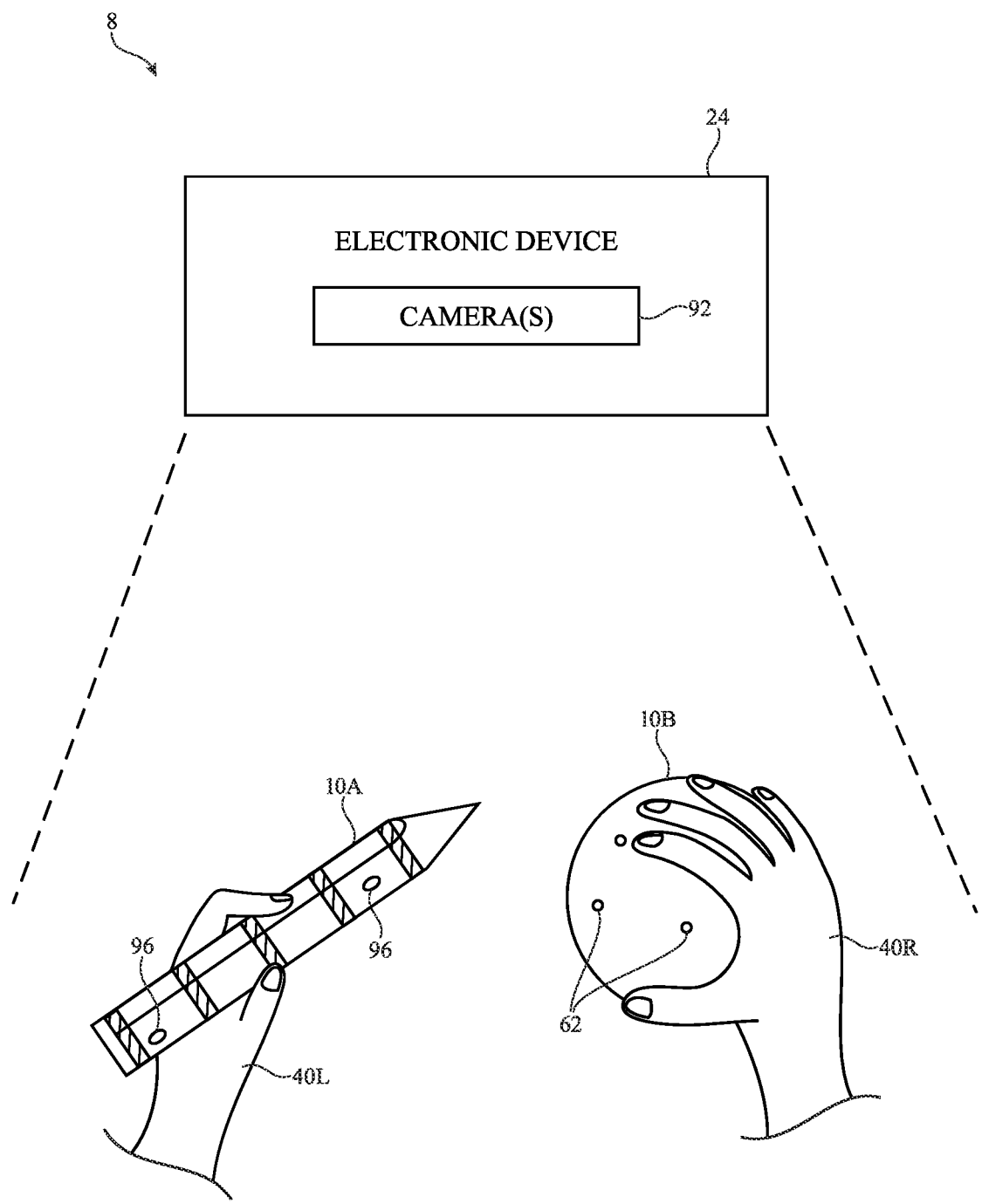
FIG. 5 is a diagram of an illustrative system including a handheld controller and a tracking device that are decoupled from one another and are used to provide input to an external electronic device such as a head-mounted device in accordance with an embodiment.

FIG. 5 is a diagram of an illustrative system in which tracking device 10B has been removed from input device 10A. As shown in FIG. 5, when tracking device 10B is removed from input device 10A, tracking device 10B and input device 10A may be used as separate controllers for external equipment such as device 24. If desired, tracking device 10B and input device 10A may have respective input-output components. For example, input device 10A may have input-output devices such as buttons, touch sensors, motion sensors, and/or other devices for receiving user input for controlling device 24. Tracking device 10B may also have input-output devices for receiving user input or for providing a user with output, or tracking device 10B may be free of input-output devices and may only include visual markers 62 to be tracked by camera 92 of device 24. This allows more than one user to control device 24 (e.g., a first user may control device 24 using input device 10A and a second user may control device 24 using tracking device 10B). This also allows a single user to use a controller in each hand (e.g., input device 10A may be held in left hand 40L of a user and tracking device 10B may be held in right hand 40R of the user).

If desired, the input-output capabilities of one controller may be shared with the other controller. For example, the wireless control circuitry of input device 10A may gather user input from tracking device 10B and may send corresponding control signals to external equipment 24. Button press input, touch input, force input, or pointing input received by input device 10A may be used to control the operational settings of tracking device 10B (as an example).

In a first mode of operation, input device 10A may be decoupled from tracking device 10A and may be used to provide input to a head-mounted device such as device 24 (as shown in the example of FIG. 3). In a second mode of operation, input device 10A may be coupled to tracking device 10B and both input device 10A and tracking device 10B may be used to provide input to head-mounted device 24 (as shown in the example of FIG. 4). In a third mode of operation, input device 10A may be decoupled from tracking device 10B and both input device 10A and tracking device 10B may be used to provide input to head-mounted device 24 (as shown in the example of FIG. 5). If desired, sensors 18 of input device 10A and/or tracking device 10B may include presence sensors (e.g., proximity sensors, optical sensors, capacitive sensors, and/or other sensors) for detecting the presence of tracking device 10B on input device 10A (e.g., for detecting whether tracking device 10B is coupled to or decoupled from input device 10A). Control circuitry 12 in input device 10A and/or tracking device 10B may, if desired, automatically switch between the first, second, and third modes of operation based on the sensor data indicating whether or not tracking device 10B is present on input device 10A.

Figure 6:
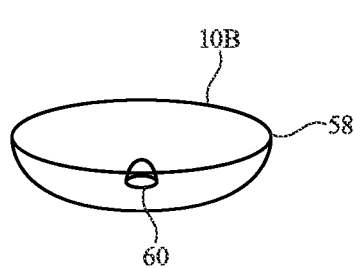
FIGS. 6, 7, 8, 9, 10, and 11 are perspective views of an illustrative tracking device with different housing shapes in accordance with embodiments.

FIGS. 6, 7, 8, 9, 10, and 11 are perspective views of illustrative tracking devices with different housing shapes. In the example of FIG. 6, housing 58 has a disk shape with opposing upper and lower surfaces and a sidewall coupled between the upper and lower surfaces. The upper and lower surfaces of housing 58 may be planar or curved. The sidewall of housing 58 may have a straight cross-sectional profile or a curved cross-sectional profile. Recess 60 may be formed in the upper surface, lower surface, or sidewall of housing 58.

Figure 7:
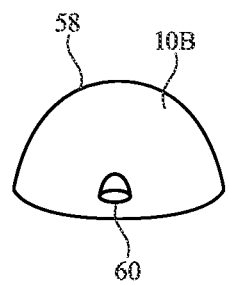

In the example of FIG. 7, housing 58 has a semi-spherical shape with a rounded upper surface and a flat lower surface. Recess 60 may be formed in the rounded upper surface or the flat lower surface of housing 58.

Figure 8:
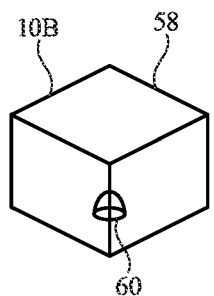

In the example of FIG. 8, housing 58 has a box (cube) shape with six planar surfaces. Recess 60 may be formed in any of the surfaces of housing 58.

Figure 9:
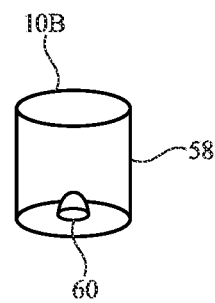

In the example of FIG. 9, housing 58 has a cylindrical shape with upper and lower planar surfaces joined by a tube-shaped sidewall. Recess 60 may be formed in the upper surface, the lower surface, or the curved sidewall of housing 58.

Figure 10:
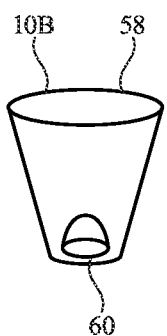

In the example of FIG. 10, housing 58 has a cone shape (or frustoconical shape) with upper and lower flat surfaces joined by a frustoconical sidewall. Recess 60 may be formed in the upper surface, the lower surface, or the curved sidewall of housing 58.

Figure 11:
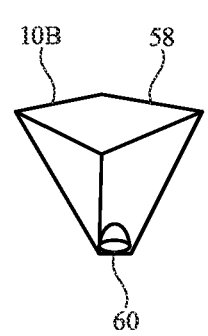

In the example of FIG. 11, housing 58 has a pyramidal shape with upper and lower flat surfaces joined by four flat sidewalls. Recess 60 may be formed in the upper surface, the lower surface, or any of the sidewalls of housing 58.

Figure 12:
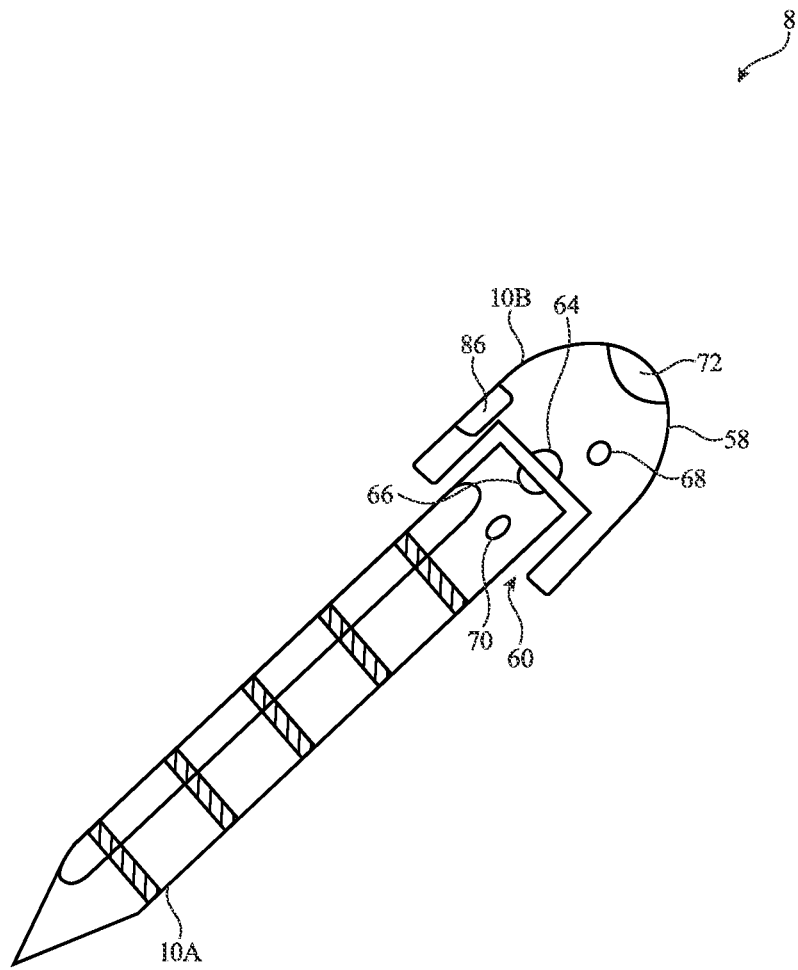
FIG. 12 is a perspective view of an illustrative system including a handheld controller and a tracking device that is removably coupled to the handheld controller in accordance with an embodiment.

FIG. 12 is a perspective view of input device 10A and tracking device 10B in an illustrative configuration in which tracking device 10B has a form factor with similar dimensions to that of input device 10A. For example, input device 10A may have a shape and dimensions similar to that of a marker, and tracking device 10B may have a shape and dimensions similar to that of a marker cap. As shown in FIG. 12, housing 58 of tracking device 10B may have recess 60 for receiving an end portion (e.g., one of tips T1 and T2) of input device 10A.

Input device 10A and tracking device 10B may communicate with each other wirelessly (e.g., over a Bluetooth® link, a WiFi® link, a 60 GHz link, other millimeter wave link, an ultra-wideband communications link, etc.) or through mating electrical contacts. For example, input device 10A and tracking device 10B may including mating contacts such as electrical contacts 66 on input device 10A and electrical contacts 64 on tracking device 10B. If desired, power may be conveyed between devices 10A and 10B through Ohmic contact or capacitive coupling between contacts 66 and 64. Arrangements in which tracking device 10B is powered wirelessly by input device 10A, by electronic device 24, and/or by another electronic device may also be used.

If desired, magnetic structures may be used to help secure tracking device 10B to input device 10A. As shown in FIG. 12, for example, input device 10A may include magnets 70 and tracking device 10B may include magnets 68. Magnets 70 and 68 may include permanent magnets and/or structures formed from magnetic material (e.g., iron bars or other ferromagnetic members that are attracted to magnets such as electromagnets and/or permanent magnets). If desired, magnets 70 and 68 may include north and south poles that are arranged such that magnets 70 are attracted to magnets 68 when contacts 64 of tracking device 10B are aligned with contacts 66 of input device 10A.

In some arrangements, tracking device 10B may include different tracking features than input device 10A to help enhance tracking accuracy. For example, as shown in FIG. 12, tracking device 10B may include tracking module 72 and inertial measurement unit 86 (e.g., accelerometers, compasses, and/or gyroscopes). Tracking module 72 may include an image sensor such as a camera (e.g., visible light camera, infrared camera, etc.). Control circuitry 12 in device 10B may gather images from the camera in tracking module 72 and motion sensor data from inertial measurement unit 86 and may use visual inertial odometry techniques to determine the location of device 10B (and therefore device 10A) in three-dimensional space, relative to surface 100 (FIG. 3), relative to device 24, etc. Visual inertial odometry involves gathering motion data as well as frames of image data of the surroundings of devices 10A and 10B and measuring position, orientation, and/or motion from the frames of image data and the motion data.

In some arrangements, tracking module 72 may include a six-degrees-of-freedom magnetic tracking system. With this type of arrangement, module 72 may include sensors (e.g., electromagnetic field receivers) that track the location of devices 10A and 10B by measuring the magnetic field strength at one or more locations. The receivers in module 72 may include three orthogonal coils. A transmitter for generating the magnetic field may be placed at a fixed location (e.g., in the user's environment). The magnetic field may induce a voltage in the coils of module 72, which can be measured and used to track the location of devices 10A and 10B.

Figure 13:
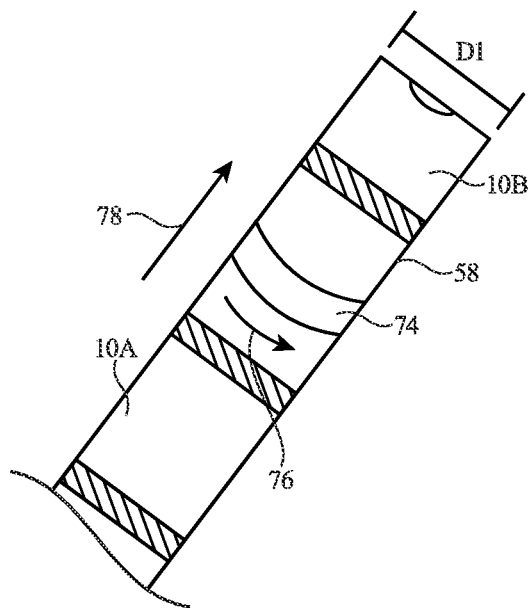
FIG. 13 is a perspective view of an illustrative handheld controller coupled to a tracking device in a retracted state in accordance with an embodiment.
Figure 14:
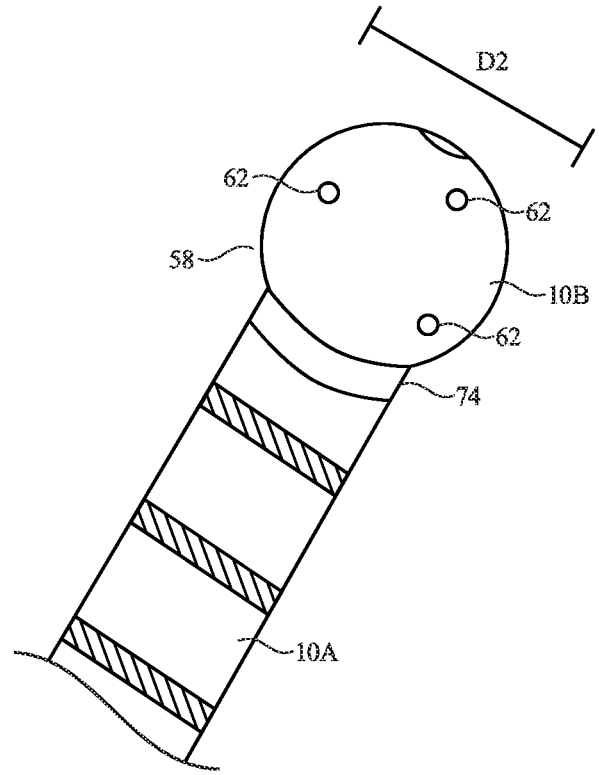
FIG. 14 is a perspective view of an illustrative handheld controller coupled to a tracking device in an expanded state in accordance with an embodiment.

FIGS. 13 and 14 show an illustrative arrangement in which tracking device 10B has an expandable housing. As shown in FIG. 13, tracking device 10B may have dimensions D1 when housing 58 of tracking device 10B is in a retracted state. This allows input device 10A to remain compact when the additional tracking capabilities of tracking device 10B are not needed. For example, a user may use input device 10A with housing 58 of tracking device 10B in the retracted state when providing input to a menu screen on device 24. In this situation, the tracking capabilities of device 10A by itself may be sufficient to locate device 10A for the purposes of providing input to the menu screen.

If the user wishes to switch to an application that requires more precise position tracking, such as a game or creative application, the user may expand housing 58. Housing 58 may expand and retract in any suitable fashion (e.g., by unfolding and folding, by opening and closing like an umbrella, by unrolling and rolling, etc.). In the example of FIG. 13, a user may expand housing 58 by twisting base 74 of tracking device 10B in direction 76. This causes housing 58 to move upward in direction 78 and expands tracking device 10B from dimension D1 to dimension D2 of FIG. 14 (e.g., a dimension larger than dimension D1).

As shown in FIG. 14, when housing 58 is in the expanded state of FIG. 14, visual markers 62 of tracking device 10B become prominent on housing 58 to enhance the precision with which device 24 tracks the location of devices 10A and 10B. In the expanded state of FIG. 14, housing 58 may have larger dimensions (e.g., a larger diameter) than input device 10A.

Figure 15:
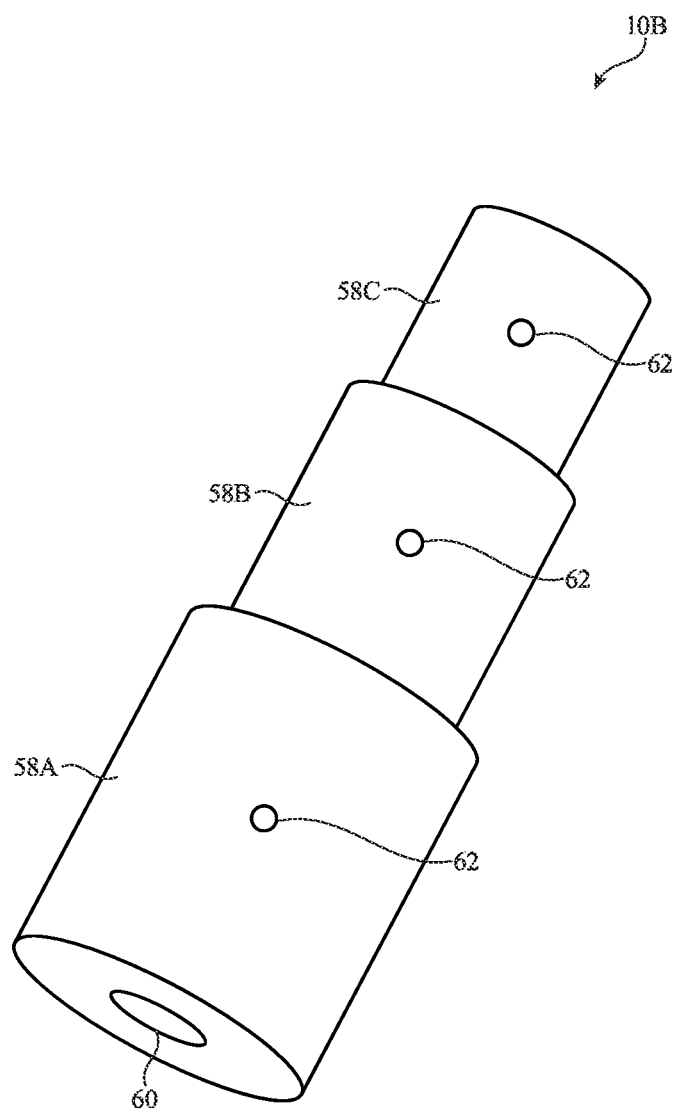
FIG. 15 is a perspective view of an illustrative tracking device having a telescoping housing in accordance with an embodiment.

In the example of FIG. 15, tracking device 10B has a telescoping housing. For example, housing 58 may include two or more housing portions such as housing portions 58A, 58B, and 58C that transition between a retracted state and an expanded state. In the retracted state, all of housing portions 58A, 58B, and 58C fit inside of one another and some visual markers 62 may be hidden from view. In the expanded state of FIG. 15, housing portions 58A, 58B, and 58C expanded to form an elongated housing where all of visual markers 62 are visible on the outside of housing 58.

Figure 16:
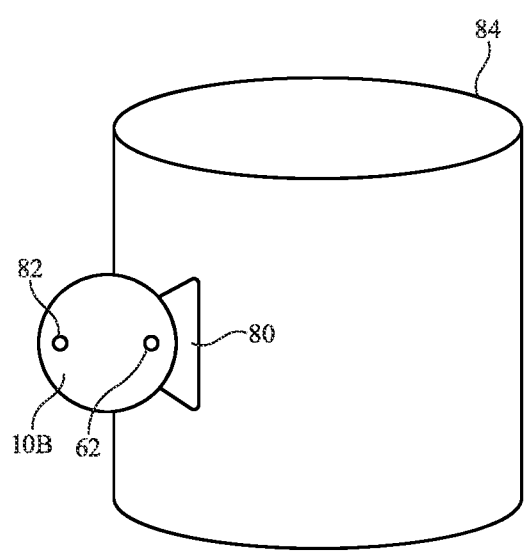
FIG. 16 is a perspective view of an illustrative item to which a tracking device has been attached in accordance with an embodiment.

FIG. 16 is a perspective view of tracking device 10B showing how tracking device 10B may be attached to an item such as item 84. Item 84 may be an item without electronics such as a cup, pen, pencil, paint brush, other writing utensil, or any other suitable object. Tracking device 10B may be placed on item 84 to convert item 84 into an input device for an external electronic device such as a head-mounted device, a computer, a laptop, a cellular telephone, a tablet computer, or other electronic device. Using the tracking capabilities of tracking device 10B (e.g., visual markers 62, a motion sensor, etc.), the external electronic device may track the motion of item 84, which in turn may be used as input to the external electronic device. For example, if a user is drinking from cup 84, the external electronic device may use the tracking capabilities of tracking device 10B to track and log the user's drinking habits. In other arrangements, item 84 may be converted to a virtual asset in a virtual reality setting (e.g., head-mounted display 24 may overlay computer-generated images onto or relative to cup 84 based on the position information gathered from tracking device 10B). If item 84 is a pen, pencil, or paintbrush that is being used to write, draw, or paint, the external electronic device may use the tracking features of tracking device 10B to track the motion of item 84 and may display the writing, drawing, painting, or other input from item 84 on a display. In this way, tracking device 10B may be used to turn everyday objects into virtual assets for a virtual reality experience or input devices (e.g., controllers) for external electronic devices.

If desired, tracking device 10B may include a visual indicator or a display such as visual output device 82 (e.g., a two-dimensional array of display pixels, one or more light-emitting diodes, a diffused light source with one or more different colors, etc.) for providing visual output to a user holding item 84 or device 10B and/or for providing visual output to other people in the user's environment. For example, visual output device 82 on tracking device 10B may indicate status information about a user wearing a head-mounted device such as device 24 while holding item 84, device 10A, and/or device 10B. The status information may indicate whether the user is busy, available, immersed in a virtual reality experience, etc.

As described above, one aspect of the present technology is the gathering and use of information such as sensor information. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, eyeglasses prescription, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A tracking device configured to be coupled to an input device having a shaft, the tracking device comprising:
   a housing having a recess configured to receive the shaft;
   visual markers on an exterior surface of the housing, wherein the visual markers are configured to be tracked by a head-mounted device that receives input from the input device; and
   control circuitry configured to operate the tracking device in first and second modes, wherein the tracking device is coupled to the input device and is used to track a location of the input device in the first mode, and wherein the tracking device is decoupled from the input device and serves as an additional input device for the head-mounted device in the second mode.

2. The tracking device defined in claim 1 wherein the visual markers comprise infrared light-emitting diodes.

3. The tracking device defined in claim 1 further comprising a sensor configured to detect whether the tracking device is coupled to or decoupled from the input device.

4. The tracking device defined in claim 1 wherein the housing has a shape selected from the group consisting of: spherical, semispherical, cylindrical, cone-shaped, disk-shaped, pyramid-shaped, and box-shaped.

5. The tracking device defined in claim 1 further comprising a motion sensor in the housing configured to gather motion sensor data.

6. The tracking device defined in claim 5 further comprising an actuator configured to provide haptic output in response to the motion sensor data.

7. The tracking device defined in claim 1 wherein the housing comprises an expandable housing that is configured to expand and retract.

8. The tracking device defined in claim 1 further comprising a camera and a motion sensor, wherein the control circuitry is configured to track a location of the tracking device using the camera, the motion sensor, and visual inertial odometry.

9. The tracking device defined in claim 1 further comprising a six-degrees-of-freedom magnetic field tracking system.

10. The tracking device defined in claim 1 further comprising a first magnet in the housing configured to attract a second magnet in the input device.

11. A tracking device for tracking a location of an item, the tracking device comprising:
    a housing operable in expanded and retracted states;
    an attachment structure configured to couple the housing to the item;
    infrared light-emitting diodes on the housing; and
    control circuitry configured to use the infrared light-emitting diodes to emit infrared light when the housing is in the expanded state.

12. The tracking device defined in claim 11 wherein the attachment structure comprises a magnet.

13. The tracking device defined in claim 11 wherein the housing is configured to twist relative to the item when transitioning between the expanded and retracted states.

14. The tracking device defined in claim 11 further comprising a motion sensor in the housing, wherein the tracking device is configured to serve as a handheld controller for a head-mounted device when the housing is decoupled from the item.

15. The tracking device defined in claim 11 wherein the housing comprises a telescoping housing.

16. A system, comprising:
    a head-mounted device having a camera;
    a handheld controller for the head-mounted device; and
    a tracking device that is removably coupled to the handheld controller and that receives power from the handheld controller, wherein the tracking device comprises visual markers and wherein the camera is configured to use the visual markers to track a location of the handheld controller.

17. The system defined in claim 16 wherein the tracking device serves as an additional handheld controller for the head-mounted device when the tracking device is decoupled from the handheld controller.

18. The system defined in claim 16 wherein the camera comprises an infrared camera and wherein the visual markers comprise infrared light-emitting diodes.

19. The system defined in claim 16 wherein the tracking device comprises an expandable housing on which the visual markers are located.

20. The system defined in claim 16 wherein the handheld controller has an elongated shaft and wherein the tracking device comprises a recess configured to receive the elongated shaft.

* * * * *